(12) United States Patent
Tse et al.

(10) Patent No.: US 12,126,486 B2
(45) Date of Patent: Oct. 22, 2024

(54) MANAGEMENT MODEL FOR NETWORK EQUIPMENT PERFORMANCE MEASUREMENTS

(71) Applicant: Telefonaktiebolaget LM Ericsson (publ), Stockholm (SE)

(72) Inventors: Edwin Tse, Montreal (CA); Robert Petersen, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 92 days.

(21) Appl. No.: 17/268,132

(22) PCT Filed: Jun. 21, 2019

(86) PCT No.: PCT/IB2019/055260
§ 371 (c)(1),
(2) Date: Feb. 12, 2021

(87) PCT Pub. No.: WO2020/035750
PCT Pub. Date: Feb. 20, 2020

(65) Prior Publication Data
US 2021/0168014 A1 Jun. 3, 2021

Related U.S. Application Data

(60) Provisional application No. 62/763,141, filed on Aug. 16, 2018.

(51) Int. Cl.
| | | |
|---|---|---|
| *H04L 41/0213* | (2022.01) | |
| *H04L 41/04* | (2022.01) | |
| *H04L 43/00* | (2022.01) | |

(52) U.S. Cl.
CPC ......... *H04L 41/0213* (2013.01); *H04L 41/04* (2013.01); *H04L 43/14* (2013.01)

(58) Field of Classification Search
CPC ..... H04L 41/0213; H04L 41/04; H04L 43/14; H04L 43/065
See application file for complete search history.

(56) References Cited

U.S. PATENT DOCUMENTS 6,012,152 A * 1/2000 Douik ................. G06F 11/0709
714/E11.027
6,643,609 B2 * 11/2003 Phan ................... G06F 11/3409
702/182

(Continued)

FOREIGN PATENT DOCUMENTS

| CN | 101026504 A | 8/2007 |
|---|---|---|
| CN | 101212359 A | 7/2008 |

(Continued)

OTHER PUBLICATIONS

3GPP TS 32.401, 3rd Generation Partnership Project; Technical Specification Group Services and System Aspects; Telecommunication management; Performance Management (PM); Concept and requirements (Release 15), Jun. 2018 (Year: 2018).*

(Continued)

*Primary Examiner* — Hitesh Patel
*Assistant Examiner* — Vinh Nguyen
(74) *Attorney, Agent, or Firm* — COATS & BENNETT, PLLC

(57) ABSTRACT

In a network Performance Measurement (PM) model, network equipment (10) maintains (102) a ManagedElement object. The ManagedElement object contains one or more ManagedFunction objects which perform and report measurements. Each ManagedFunction object has one or more Measurement objects (106) that specifies a measurement, and lists a reporting period. The ManagedElement object contains a PMControl object (104), which specifies the reporting mode and includes an administrative state attribute of the ManagedElement object that is controlled by the (Continued)

network management system (20). The ManagedElement object controls (110) an operational state attribute of the PMControl object based on resources to perform the measurement and access to the relevant reporting mechanism (108). When both states of the PMControl object are set to a functional value (112), the ManagedFunction objects perform (114) and report (118) the results of measurement specified in associated Measurement objects.

26 Claims, 6 Drawing Sheets

(56) References Cited

U.S. PATENT DOCUMENTS

| | | | | |
|---|---|---|---|---|
| 7,233,843 | B2* | 6/2007 | Budhraja | H02J 13/00001 709/224 |
| 7,293,090 | B1* | 11/2007 | Saleh | H04L 45/60 714/10 |
| 7,299,277 | B1* | 11/2007 | Moran | H04L 43/12 709/224 |
| 7,610,288 | B2* | 10/2009 | Dickerson | G06Q 10/0639 707/999.102 |
| 7,708,802 | B1* | 5/2010 | Deane | B01D 53/047 96/417 |
| 7,848,947 | B1* | 12/2010 | McGloin | G06Q 10/10 705/7.42 |
| 9,241,277 | B2* | 1/2016 | Kozisek | H04L 41/142 |
| 9,769,018 | B2* | 9/2017 | Hubinette | H04W 24/08 |
| 10,333,635 | B2* | 6/2019 | Siomina | H04B 17/309 |
| 10,904,086 | B1* | 1/2021 | Varia | H04L 43/0817 |
| 2003/0093245 | A1* | 5/2003 | Schmit | G06F 9/44 702/186 |
| 2004/0128586 | A1* | 7/2004 | Bahr | H04L 41/0233 714/E11.023 |
| 2004/0205689 | A1* | 10/2004 | Ellens | G06Q 10/0637 717/100 |
| 2005/0018611 | A1* | 1/2005 | Chan | H04L 43/0888 709/224 |
| 2006/0029016 | A1* | 2/2006 | Peles | H04L 69/16 370/328 |
| 2008/0254798 | A1* | 10/2008 | Power | H04W 48/08 455/436 |
| 2010/0106459 | A1* | 4/2010 | Bakalov | G06F 11/3419 702/182 |
| 2012/0157089 | A1* | 6/2012 | Yang | H04W 24/08 455/424 |
| 2012/0159235 | A1* | 6/2012 | Suganthi | G06F 11/2048 714/E11.073 |
| 2012/0182865 | A1* | 7/2012 | Andersen | H04L 1/22 370/228 |
| 2012/0254825 | A1* | 10/2012 | Sharma | G06F 8/34 717/101 |
| 2013/0018836 | A1* | 1/2013 | Hofstaedter | G06F 15/173 706/47 |
| 2014/0012867 | A1* | 1/2014 | Moss | G06Q 10/067 707/756 |
| 2014/0019985 | A1* | 1/2014 | Krajec | G06F 9/4806 718/102 |
| 2014/0025572 | A1* | 1/2014 | Krajec | G06F 11/3636 705/40 |
| 2014/0169196 | A1* | 6/2014 | Kay | H04L 63/1408 370/252 |
| 2014/0237464 | A1* | 8/2014 | Waterman | G06F 8/658 717/172 |
| 2014/0304399 | A1* | 10/2014 | Chaudhary | G06F 11/3093 709/224 |
| 2014/0355484 | A1* | 12/2014 | Foster | H04W 16/18 370/255 |
| 2015/0095237 | A1* | 4/2015 | Naik | G06Q 10/10 705/59 |
| 2015/0186206 | A1* | 7/2015 | Bhattacharya | G06F 11/3027 714/3 |
| 2016/0119181 | A1 | 4/2016 | Suzuki | |
| 2016/0218920 | A1* | 7/2016 | Hubinette | H04L 43/062 |
| 2016/0232354 | A1* | 8/2016 | Fraser | G06F 21/554 |
| 2016/0380852 | A1 | 12/2016 | Kawamori et al. | |
| 2017/0180190 | A1* | 6/2017 | Kubinszky | G06F 11/3466 |
| 2017/0272970 | A1* | 9/2017 | Mendo Mateo | H04W 28/0236 |
| 2017/0339660 | A1* | 11/2017 | Kazmi | H04W 64/003 |
| 2018/0213059 | A1* | 7/2018 | Alsina | H04L 67/306 |
| 2018/0248878 | A1* | 8/2018 | El-Moussa | H04L 63/1483 |
| 2018/0278501 | A1* | 9/2018 | Johnson | H04L 43/06 |
| 2019/0102411 | A1* | 4/2019 | Hung | G06N 5/025 |
| 2020/0389531 | A1* | 12/2020 | Lee | H04L 67/51 |

FOREIGN PATENT DOCUMENTS

| | | |
|---|---|---|
| CN | 106301884 A | 1/2017 |
| WO | 2015119544 A1 | 8/2015 |
| WO | 2016191180 A1 | 12/2016 |
| WO | 2017222609 A1 | 12/2017 |
| WO | 2017222613 A1 | 12/2017 |

OTHER PUBLICATIONS

3rd Generation Partnerhip Project, "Technical Specification Group Services and System Aspects; Telecommunication management;Performance Management (PM)Integration Reference Point (IRP):Information Service (IS)(Release 12)", 3GPP TS 32.412 V12.0.0, Oct. 2014, pp. 1-68.

3rd Generation Partnerhip Project, "Technical Specification Group Services and System Aspects; Management and orchestration of 5G networks; Performance assurance(Release 15)", 3GPP TS 28.550 V1.2.2, Aug. 2018, pp. 1-48.

3rd Generation Partnerhip Project, "Technical Specification Group Services and System Aspects; Telecommunication management; Configuration Management (CM); Notification Integration Reference Point (IRP); Information Service (IS)(Release 12)", 3GPP TS 32.302 V12.0.0, Oct. 2014, pp. 1-27.

3rd Generation Partnerhip Project, "Technical Specification Group Services and System Aspects; Management and orchestration of networks and network slicing; Performance Management (PM); Stage 2 and stage 3 (Release 15)", 3GPP TS 28.551 V0.3.0, Jul. 2018, pp. 1-34.

3rd Generation Partnerhip Project, "Technical Specification Group Services and System Aspects; Management and orchestration of networks and network slicing; NR and NG-RAN performance measurements and assurance data(Release 15)", 3GPP TS 28.552 V0.4.0, Jul. 2018, pp. 1-26.

3rd Generation Partnerhip Project, "Technical Specification Group Services and System Aspects; Telecommunication management;Performance Management (PM)Integration Reference Point (IRP):Information Service (IS)(Release 15)", 3GPP TS 32.412 V15.0.0, Jun. 2018, pp. 1-68.

3rd Generation Partnerhip Project, "Technical Specification Group Services and System Aspects; Telecommunication management; Performance Management (PM); Performance measurements; Universal Terrestrial Radio Access Network (UTRAN) (Release 12)", 3GPP TS 32.405 V12.0.0, Oct. 2014, pp. 1-189.

* cited by examiner

MANAGEMENT MODEL FOR NETWORK EQUIPMENT PERFORMANCE MEASUREMENTS

RELATED APPLICATIONS

This application claims priority to U.S. Application No. 62/763,141, filed 16 Aug. 2018, the disclosure of which is incorporated by reference herein in its entirety.

FIELD OF INVENTION

The present invention relates generally to networks, and in particular to a network management model for the collection of performance management measurements of network activity.

BACKGROUND

Computing and telecommunications networks have grown in size, sophistication, and complexity, long past the point of effective manual network management. Network management systems to automate the considerable task of network monitoring and management have been developed and improved; many are sophisticated, complex software systems in their own right. Performance Measurement (PM) is one important aspect of network management. Under PM, network nodes perform and report various network operational metrics (e.g., "call drop rate," "memory utilization," and the like).

One model of PM in the prior art utilizes the concept of "jobs," and an agent (e.g., Element Manager) as an intermediary between a network management system and individual network nodes performing and reporting the measurements, using a series of protocol exchanges to establish the system of reporting. Some networking Technical Specifications relating to PM and network management include:

3GPP TS 32.412 "Performance Measurements (PM) Integration Reference Point: Information Service"

3GPP TS 28.551 "Management and orchestration of networks and network slicing: Performance Management (PM); stage 2 and stage 3"

3GPP TS 32.302 "Configuration Management: Notification IRP: IS"

3GPP TS 28.552 "5G Core Network performance measurements and assurance data"

3GPP TS 32.405: "Performance Management (PM); Performance measurements; Universal Terrestrial Radio Access Network (UTRAN)"

These prior art solutions to reporting network PM involve a high number of standardized interactions. For example, there is a need to implement specialized operations to establish a Subscription (see 32.303) between the operator's management system and a managed node. The use of this Subscription mechanism is to provide the managed node a reference (e.g., a call back address) so that the managed node can issue a notification (e.g., "notify file ready") about the availability of the measurement files (i.e., file containing the PMs desired by the management system). Upon reception of such notification, the management system would then fetch the measurement file.

Additionally, these prior art PM systems require the implementation of operations such as createMeasurementJob, stopMeasurementJob, suspendMeasurementJob, resumeMeasurementJob, listMeasurementJobs, and notifyMeasurementJobStatusChanged (see 32.412, 28.551, 32.302, 28.552). The operation that creates a measurement job requires nine input parameters. The complexity is necessary in a management network deployment scenario when the management system interacts with the managed nodes via a system, normally called Element Manager or Domain Manager.

In addition to this complexity, there is no possibility for a management system to ascertain, at run-time, which managed nodes in the network are reporting measurements, or what types of measurements they are reporting. While the prior art solution to PM is suitable for implementation by an entity such as Element Manager, which itself manages multiple managed nodes, it is not optimal for implementation by individual managed nodes.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments of the present invention described and claimed herein, a simple network model enables equipment to perform PM and send the results directly to a network management system or write the results to a predetermined file location, where the system can retrieve them. The equipment maintains a Network Resource Management (NRM) Information Object Class (IOC) ManagedElement object. The ManagedElement object contains one or more NRM IOC ManagedFunction objects which perform and report measurements. Each ManagedFunction object has one or more NRM dataType Measurement objects that contains a measurement, and lists a reporting period. The ManagedElement object contains an NRM IOC PMControl object, which specifies the reporting mode and includes an administrative state attribute of the ManagedElement object (INACTIVE or ACTIVE) that is controlled by the network management system. The ManagedElement object controls an operational state attribute of the PMControl object (DISABLED OR ENABLED) based on resources to perform the measurement and access to the relevant reporting mechanism. When the PMControl object is both ACTIVE (network management system) and ENABLED (ManagedElement object), the ManagedFunction objects perform and report the results of measurement specified in associated Measurement objects.

One embodiment relates to a method, performed by equipment operative in a network, of participating in a Network Resource Management (NRM) Performance Measurement (PM) procedure. An NRM Information Object Class (IOC) ManagedElement object is maintained. The ManagedElement object contains one or more NRM IOC ManagedFunction objects. Each ManagedFunction object is operative to perform specified measurements by the equipment and report the results. An NRM IOC PMControl object is maintained. The PMControl object includes attributes controlling an administrative state and operational state. The PMControl object also includes one of a notification target attribute and file location attribute for reporting the results of the specified measurements. For each ManagedFunction object, one or more NRM dataType Measurement objects are maintained. Each Measurement object includes attributes specifying a measurement to be performed and a reporting period. The availability of resources required to perform the specified measurements, and access to the specified reporting mechanism, are verified. Such availability and access are indicated by setting the operational state attribute of the PMControl object. Upon a network management system setting the administrative state attribute of the PMControl object, and if the operational state attribute of the PMControl object is set, for each Measurement object, the specified measurement is performed and the results assembled. At the expiration of each reporting period, the results are reported.

Another embodiment relates to equipment operative in a network. The equipment includes communication circuitry adapted to send measurement results to a network node or write the results to a file location; measurement circuitry adapted to perform specified measurements; and processing circuitry operatively connected to the communication circuitry and measurement circuitry. the processing circuitry is adapted to maintain an Network Resource Management (NRM) Information Object Class (IOC) ManagedElement object containing one or more NRM IOC ManagedFunction objects, each ManagedFunction object operative to perform specified measurements and report the results; maintain a NRM IOC PMControl object including attributes controlling an administrative state and operational state, and one of a notification target and file location for reporting the results of the specified measurements; maintain, for each ManagedFunction object, one or more NRM dataType Measurement objects, each Measurement object including attributes specifying a measurement to be performed and a reporting period; verify the availability of resources required to perform the specified measurements and access to the specified reporting mechanism, and indicate such availability and access by setting the operational state attribute of the PMControl object; and upon a network management system setting the administrative state attribute of the PMControl object, and if the operational state attribute of the PMControl object is set, for each Measurement object, perform the specified measurement and assemble the results; and at the expiration of each reporting period, report the results.

Yet another embodiment relates to a computer readable medium, having thereon instructions operative to cause processing circuitry on an instance of network equipment to participate in a Network Resource Management (NRM) Performance Monitoring (PM) procedure. The instructions cause the processing circuitry to perform the steps of: maintaining an NRM Information Object Class (IOC) ManagedElement object containing one or more NRM IOC ManagedFunction objects, each ManagedFunction object operative to perform specified measurements by the equipment and report the results; maintaining a NRM IOC PMControl object including attributes indicating an administrative state and operational state, and one of a notification target and file location for reporting the results of the specified measurements; maintaining, for each ManagedFunction object, one or more NRM dataType Measurement objects, each Measurement object including attributes specifying a measurement to be performed and a reporting period; verifying the availability of resources required to perform the specified measurements and access to the specified reporting mechanism, and indicating such availability and access by setting the operational state attribute of the PMControl object; and upon a network management system setting the administrative state attribute of the PMControl object, and if the operational state attribute of the PMControl object is set, for each Measurement object, performing the specified measurement and assembling the results; and at the expiration of each reporting period, reporting the results.

Yet another embodiment relates to a method, performed by a network management system performing a Network Resource Management (NRM) Performance Measurement (PM) procedure in a network, of obtaining measurements from network equipment. An administrative state attribute of a NRM Information Object Class (IOC) PMControl object maintained by the equipment is set, allowing one or more NRM IOC ManagedFunction objects maintained by the equipment to perform measurements and report the results as specified in one or more NRM dataType Measurement objects associated with each ManagedFunction object. After the expiration of each reporting period as specified in each Measurement object, the specified measurement results are obtained.

Still another embodiment relates to a management node operative in a network and performing a Network Resource Management (NRM) Performance Measurement (PM) procedure in the network. The management node includes communication circuitry adapted to receive measurement results from equipment or read the results from a file location; and processing circuitry operatively connected to the communication circuitry. The processing circuitry is adapted to set an administrative state attribute of a NRM Information Object Class (IOC) PMControl object maintained by the equipment, allowing one or more NRM IOC ManagedFunction objects maintained by the equipment to perform measurements and report the results as specified in one or more NRM dataType Measurement objects associated with each ManagedFunction object; and after the expiration of each reporting period as specified in each Measurement object, obtain the specified measurement results.

Still another embodiment relates to a computer readable medium, having thereon instructions operative to cause processing circuitry on a management node operative in a network to perform a Network Resource Management (NRM) Performance Monitoring (PM) procedure in the network. The instructions cause the processing circuitry to perform the steps of: setting an administrative state attribute of a NRM Information Object Class (IOC) PMControl object maintained by the equipment, allowing one or more NRM IOC ManagedFunction objects maintained by the equipment to perform measurements and report the results as specified in one or more NRM dataType Measurement objects associated with each ManagedFunction object; and after the expiration of each reporting period as specified in each Measurement object, obtaining the specified measurement results.

Still another embodiment relates to a network. The network includes a network management node operative in the network and adapted to execute a Network Resource Management (NRM) Performance Measurement (PM) procedure including gathering measurements of network activity. The network node is adapted to obtain predetermined measurements of network activity directly from one or more instances of equipment by setting an attribute of a NRM Information Object Class (IOC) PMControl object at each instance of network equipment, and obtaining from the equipment the measurement results. The network further includes an instance of network equipment operative in the network and adapted to: maintain an NRM IOC ManagedElement object naming one or more NRM IOC ManagedFunction objects, each ManagedFunction object operative to perform specified measurements and report the results; maintain the PMControl object; maintain, for each ManagedFunction object, one or more NRM dataType Measurement objects, each Measurement object including attributes specifying a measurement to be performed and a reporting period; and upon the network management node setting an administrative state attribute of the PMControl object, for each Measurement object, perform the specified measurement and assemble the results; and at the expiration of each reporting period, report the results.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
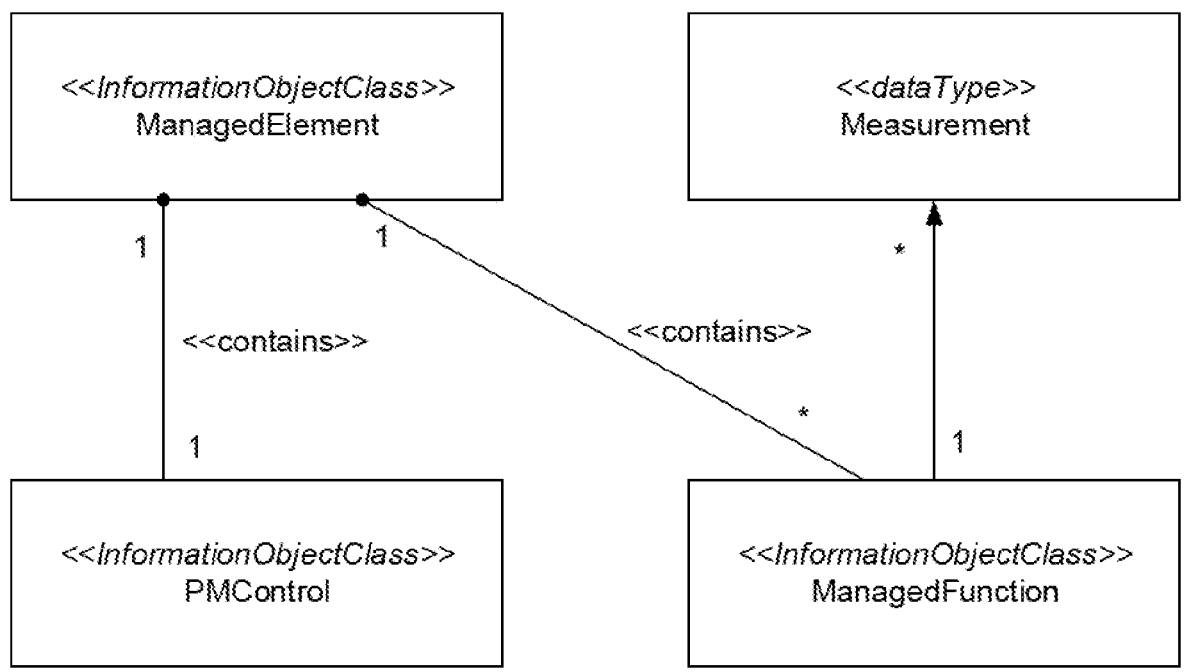
FIG. 1 is a network model diagram of a network management model fragment.

FIG. 1 depicts objects of a Network Resource Management (NRM) model fragment according to embodiments of the present invention. Two of the objects, ManagedElement and ManagedFunction, are known. These objects, both of Information Object Class (IOC), are defined, e.g., in the specifications listed in the Background section. Briefly, and without limitation, a ManagedElement object corresponds to a network node or other piece of equipment (hereinafter referred to as "equipment"). The ManagedElement object contains one or more ManagedFunction objects, which correspond to distinct operations which the managed equipment may perform. ManagedFunction objects obtain Performance Measurements (PM) for a network management system, and produce periodic measurement reports. Two new objects are the IOC PMControl and dataType Measurements. Each ManagedElement object contains one PMControl object. The PMControl object may be altered at runtime by both the ManagedElement object and by the network system management, as explained herein. The PMControl object includes attributes controlling the administrative and operational states of the PMControl object (and hence, the measurement procedure), and specifies how PM results are to be communicated to the network system management. Each ManagedFunction object contains one or more Measurement objects. Each Measurement object identifies a specific measurement to be performed, and a reporting period. The Measurement objects are provisioned in the managed equipment. Accordingly, they are defined in advance by agreement between the network system management and vendor or operator of the controlled equipment. The network system management cannot alter a Measurement object at runtime.

When the PM procedure is enabled by both the equipment and the network system management (via the PMControl object), each ManagedFunction object performs measurements as specified in its one or more Measurement objects. The ManagedFunction object reports the measurement results at the periodicity defined in the Measurement objects. The mode of reporting measurement results is defined in PMControl object, and comprises either sending the results directly to a specified node, or writing the results to a specified file location, where one or more network system management functions may read the results.

The attributes of the PMControl object include administrativeState, operationalState, fileLocation, and notificationTarget. The attributes administratiSvtaete and operationalState both control the measurement-taking and reporting activity of the equipment; they are set and reset by the network management system and the equipment, respectively. The attributes fileLocation and notificationTargets define the two means of reporting measurement results. In one embodiment, the attributes are mutually exclusive; only one of the attributes may be set (i.e., contain a value). In another embodiment, the two attributes define two means of reporting measurement results. In such case, both attributes will be set (i.e., contain a value). Table 1 summarizes the PMControl object attributes:

TABLE 1

PMControl Object Attributes

| Attribute Name | Values | Written by | Description |
| --- | --- | --- | --- |
| administrativeState | UNLOCK (set) LOCK (reset) | network system management | Set by network to begin measurements; reset by network to suspend or end measurements |

TABLE 1-continued

PMControl Object Attributes

| Attribute Name | Values | Written by | Description |
| --- | --- | --- | --- |
| operationalState | ENABLED (set) DISABLED (reset) | ManagedElement | Set by equipment when permissions and access allow measurement and reporting to proceed. |
| fileLocation | URL of management report file site | network system management | Informs ManagedFunctions to write measurement results to this location. If insufficient space, existing reports are deleted or overwritten. |
| notificationTargets | URLs of management nodes | network system management | Informs ManagedFunctions to send measurement results to these nodes. |

The attributes of the Measurement object include measurementName and granularityPeriod. The measurementName attribute defines a measurement to be performed, and the granularityPeriod attribute defines the periodicity at which the measurement results are to be reported (as defined by the fileLocation or notificationTarget attributes of the PMCommand object). These attributes are defined by standards, e.g., in the 3GPP technical standards listed in the Background section, or may be defined by contract between the network operator and the vender providing the managed equipment. For example the granularityPeriod attribute is defined:

The NE [Network Element] shall generate one measurement report (measurement record) immediately at the end of each granularity period. This measurement report shall contain all measurement results produced by the NE within that granularity period. For example, if a NodeB runs 10 measurements with a granularity period of 15 minutes and 5 measurements with a granularity period of 5 minutes, then it shall generate one measurement report containing 10 results every 15 minutes, and one measurement report containing 5 measurement results every 5 minutes.

3GPP TS 32.432 V 15.1.0 (2018-12)

The Measurement object is named by a ManagedFunction object. The Measurement object cannot be modified at run time. Table 2 summarizes the Measurement object attributes:

TABLE 2

Measurement Object Attributes

| Attribute Name | Description |
| --- | --- |
| measurementName | Defines the measurement to be performed. May be a measurement name specified in a technical standard, or may be defined by contract. Not writeable at run time. |
| granularityPeriod | Defines the granularity period for the named measurement, in seconds. Measurement results are reported at the expiry of every granularity period. Defined in a technical standard, or may be defined by contract. Not writeable at run time. |

Figure 2:
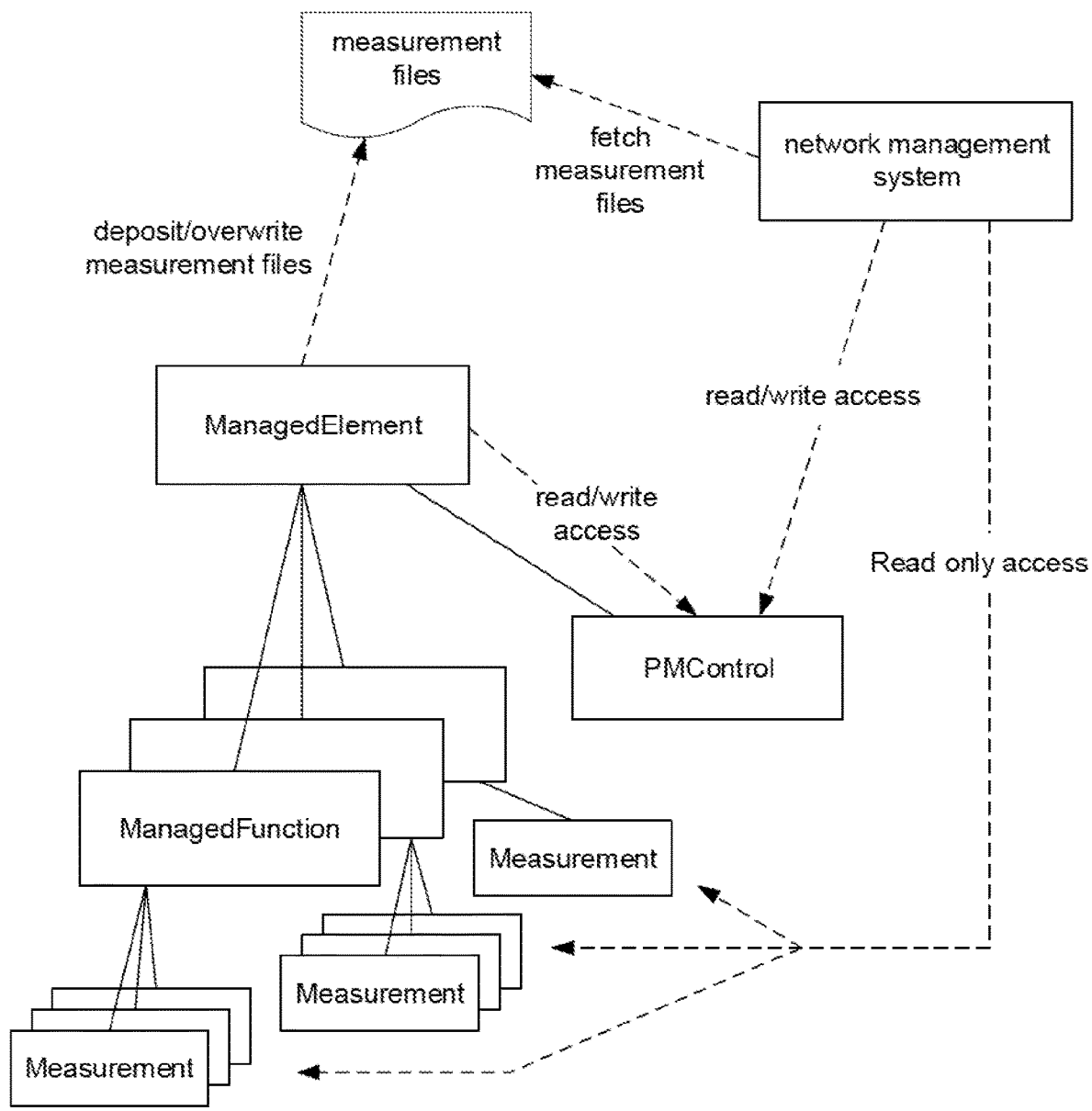
FIG. 2 is a block diagram depicting the access permissions of various objects in the network management model fragment.

FIG. 2 is a block diagram of the relevant model objects, showing their relationships and various access permissions. The ManagedElement object contains one or more Managed Function objects. Each ManagedFunction object contains one or more Measurement objects. These objects are all set by the equipment vendor, or by contract between the equipment vendor or operator and the network operator (or as part of a network upgrade or reconfiguration). The network management system has read-only access to the ManagedFunction and Measurement objects.

The ManagedElement object also contains a PMControl object, which is initiated and updated by the network management system. Both the equipment (i.e., the ManagedElement object) and the network management system have read/write access to the PMControl object. Both entities must "set," or enable, the relevant state attributes in the PMControl object for the measurement and reporting to commence.

In one embodiment (in which the PMControl object attribute fileLocation is set with a resolvable URL), as measurements are performed, and as the associated reporting period for reporting the measurements expires, the equipment writes measurement results to the file location. If there is insufficient space for the measurement results, the equipment deletes or overwrites older measurement reports. Any time after the expiration of the specified granularityPeriod, the network management system may read the measurement reports from the file location. In one embodiment, the network management system has read-only access to the file location; only the equipment may delete measurement results (and then only if necessary to store new ones). In this manner, multiple network management system functions may independently access the measurement reports from the file location, without the need for coordination regarding deletion of the measurement reports. In other embodiments, the network management system may have read/write access to the file location, and it coordinates data retention with any other management functions.

Figure 3:
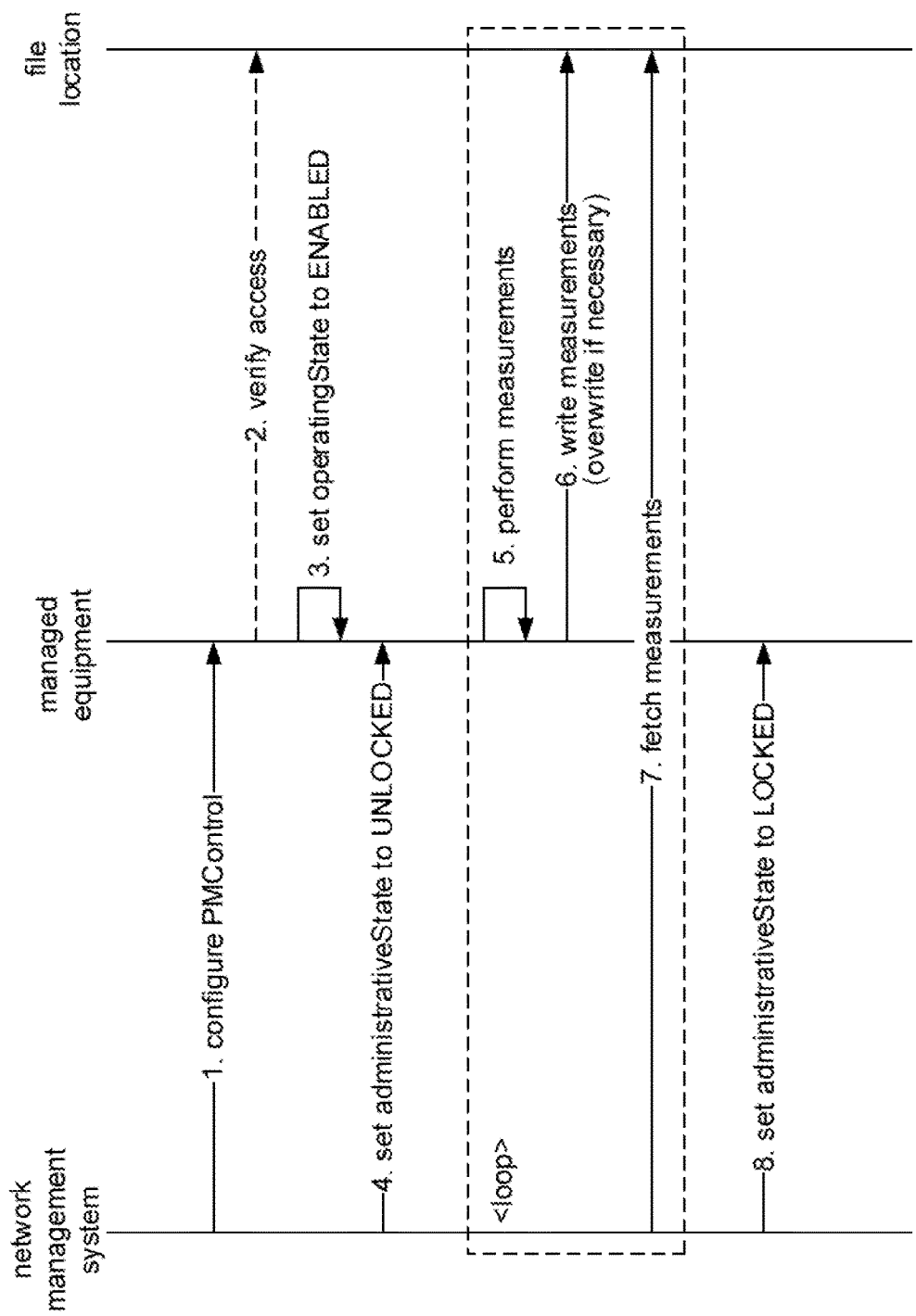
FIG. 3 is a signaling diagram depicting control signaling for Performance Measurements (PM).

FIG. 3 is a signaling diagram depicting one embodiment of a measurement collection operation. At step 1, the network management system configures a PMControl object on the managed equipment. The PMControl object attributes administrativeState and operationalState are initially reset (e.g., LOCKED and DISABLED, respectively). Those of skill in the art will readily realize that the actual attribute values described herein (as well as the object names) are representative only and are not limiting. As used herein, a PMControl object attribute is "set" by writing a value to it that enables measurement operations, and it is "reset" by writing a value that disables measurement operations.

In this embodiment, the PMControl object attribute fileLocation has the value of a URL where the managed equipment should write measurement results (and the attribute notificationTarget is blank, or NULL). Upon seeing the fileLocation attribute, in step 2 the managed equipment verifies that it has access and write permission to the specified file location. The managed equipment also verifies that it has any permissions, access, or resources necessary to perform the specified measurements (not shown).

At step 3, the ManagedElement object sets the operationalState attribute of the PMControl object—e.g., it writes the value of ENABLED. At this point, although the managed equipment is "ready," it cannot begin performing measurements, because while its operationalState attribute is set ("ENABLED"), its administrativeState attribute is still reset ("LOCKED"). At step 4, the network management system enables measurements by setting the PMControl object administrativeState attribute (e.g., writing the value "UNLOCKED").

Note that both the administrativeState and operationalState attributes must be set (e.g., ENABLED and UNLOCKED, respectively) for the managed equipment to begin performing measurements. The temporal order in which these attributes are set is irrelevant. For example, the network management system could have set the administrativeState attributes in step 1—in this case, measurements would start immediately following step 3, when the ManagedElement object sets the operationalState attribute. Alternatively, the network management system may "poll" the PMControl object operationalState attribute to verify that the managed equipment is capable of performing all measurements and reporting the results as specified, before setting the administrativeState attribute to begin the measurements.

Regardless of the order in which the administrativeState and operationalState attributes are set, the managed equipment begins performing the measurements specified in the Measurement object(s) at step 5. Upon the expiration of each reporting period associated with each measurement, the equipment writes the measurement results to the file location, at step 6. In one embodiment, if there is insufficient room to hold the current measurement results, the equipment deletes or overwrites the oldest measurement report(s), as required to free sufficient space to write the current report. At any time after the expiration of the reporting period, the network management system may fetch the measurement results from the file location, at step 7. This eliminates the need for close coordination between the network management system and the managed equipment—or the use of an agent—to schedule delivery of the measurement results.

As indicated by the dashed "loop" box in FIG. 3, steps 5, 6, and 7 will repeat so long as both the PMControl objects administrativeState and operationalState attributes are set. At step 8, the network management system may terminate the PM measurement operation by resetting the administrativeState attribute—e.g., writing a value of LOCKED to the PMControl object administrativeState attribute.

Figure 4:
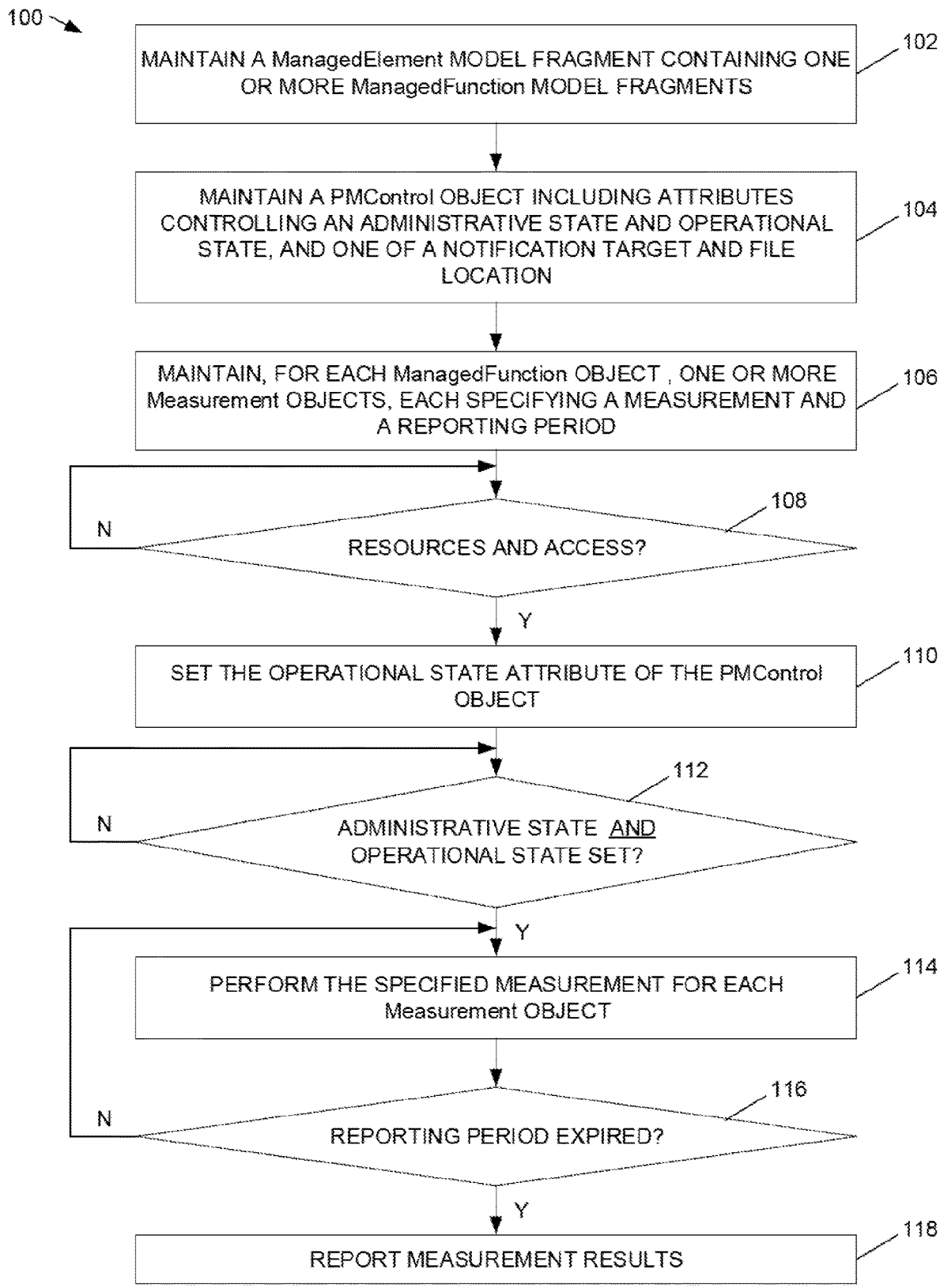
FIG. 4 is a flow diagram of a method of participating in a Network Resource Management (NRM) PM procedure by network equipment.

FIG. 4 depicts the steps in a method (100), performed by equipment operative in a network, of participating in a Network Resource Management (NRM) Performance Measurement (PM) procedure. The equipment maintains an NRM Information Object Class (IOC) ManagedElement object containing one or more NRM IOC ManagedFunction objects (block 102). Each ManagedFunction object is operative to perform specified measurements and report the results. The equipment also maintains a NRM IOC PMControl object including attributes controlling an administrative state and operational state, and one of a notification target and file location for reporting the results of the specified measurements (block 104). The equipment further maintains, for each ManagedFunction object, one or more NRM dataType Measurement objects. Each Measurement object includes attributes specifying a measurement to be performed and a reporting period (block 106). The equipment verifies the availability of resources required to perform the specified measurements and access to the specified reporting mechanism (block 108). If sufficient resources are not available, or the equipment does not have access to the specified reporting mechanism, control flow halts. Assuming the resource and access verification is successful, the equipment indicates such availability and access by setting the operational state attribute of the PMControl object (block 110). Upon a network management system setting the administrative state attribute of the PMControl object, and if the operational state attribute of the PMControl object is set (block 112), for each Measurement object, the equipment performs the specified measurement and assembles the results (114). At the expiration of each reporting period (block 116), the equipment reports the results according to the specified reporting mode (block 118).

Figure 5:
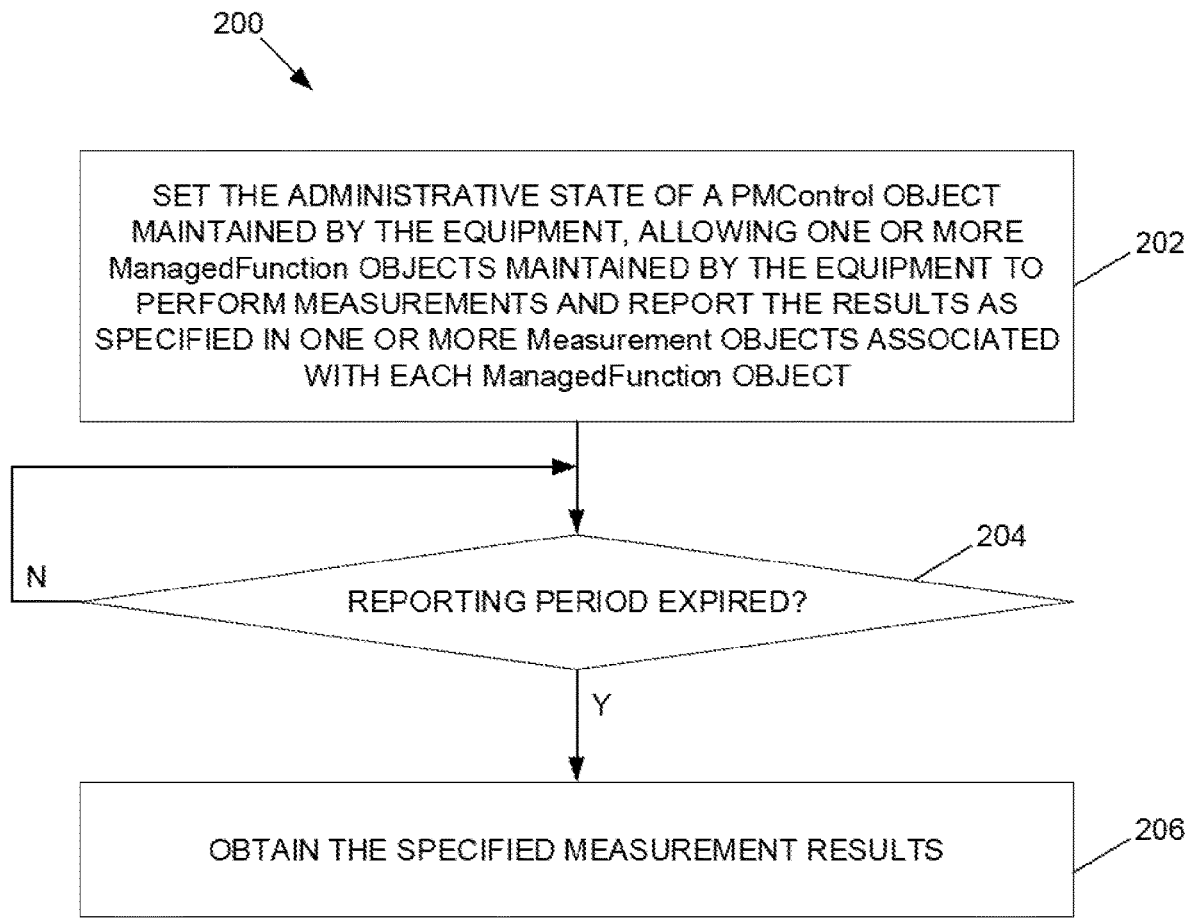
FIG. 5 is a flow diagram of obtaining measurements from network equipment by a network management system performing NRM PM.

FIG. 5 depicts the steps in a method (200), performed by a network management system performing a NRM PM procedure in a network, of obtaining measurements from network equipment. The network management system sets an administrative state attribute of a NRM IOC PMControl object maintained by the equipment (block 202). This allows one or more NRM IOC ManagedFunction objects maintained by the equipment to perform measurements and report the results. The measurements and reporting modes are specified in one or more NRM dataType Measurement objects associated with each ManagedFunction object. After the expiration of each reporting period (block 204), the network management system obtains the specified measurement results (block 206). Depending on the reporting attributes specified in the PMControl object, the equipment will either send measurement results directly to a specified node, or write the results to a specified file location for later retrieval by the network management system.

Figure 6:
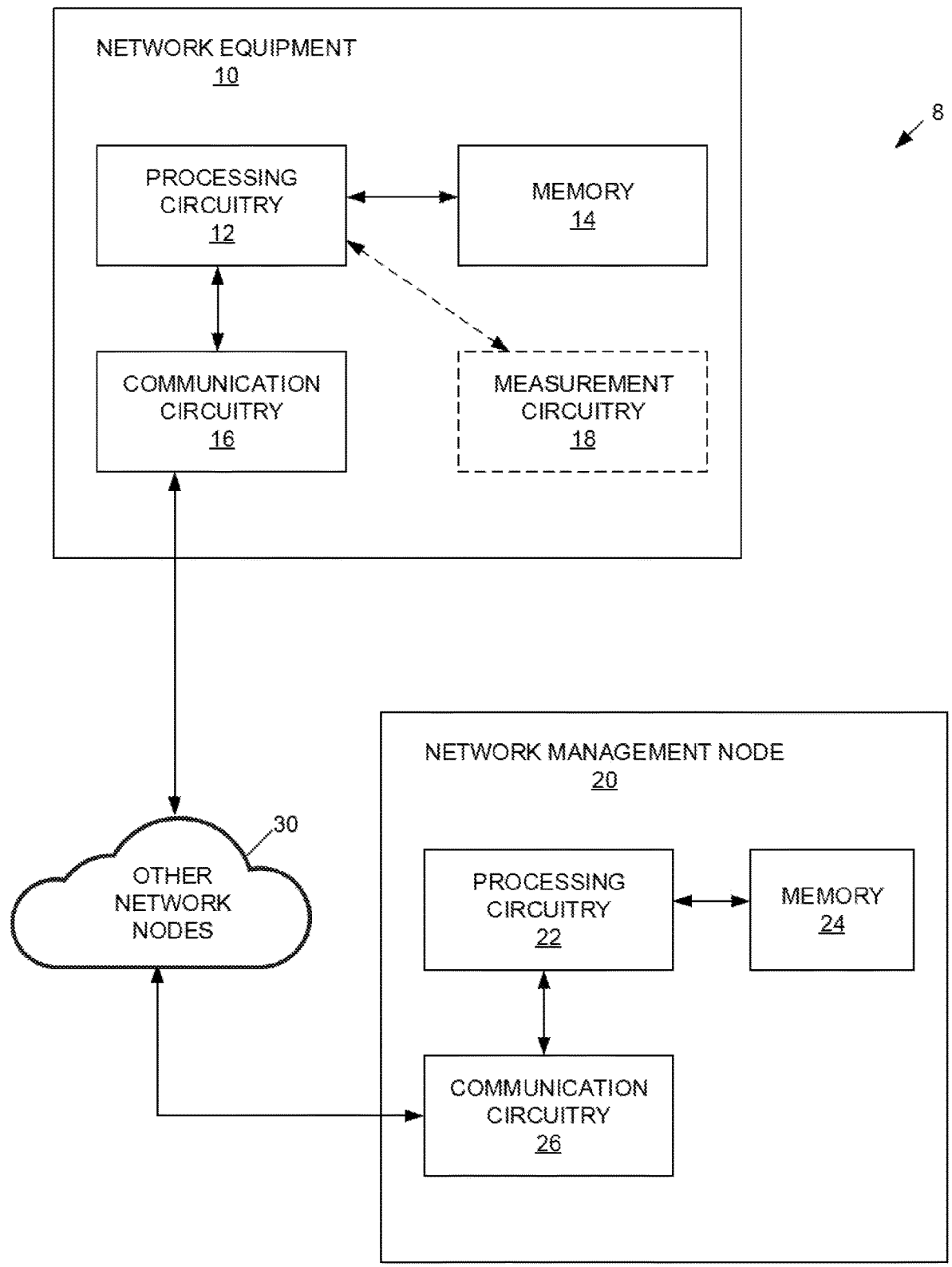
FIG. 6 is a diagram of a network, including block diagrams of network equipment and a network management node.

FIG. 6 depicts a representative network 8, including an instance of network equipment 10, a network management node 20, and other network nodes 30. The other network nodes 30 may include, for example, a file storage location specified in the fileLocation attribute of the PMControl object. The network equipment 10 includes processing circuitry 12, memory 14, communication circuitry 16, and in some embodiments, measurement circuitry 18 operative to obtain, compile, and report specified measurements of network activity. Although the memory 14 is depicted as being separate from the processing circuitry 12, those of skill in the art understand that the processing circuitry 12 includes internal memory, such as a cache memory or register file. Those of skill in the art additionally understand that virtualization techniques allow some functions nominally executed by the processing circuitry 14 to actually be executed by other hardware, perhaps remotely located (e.g., in the so-called "cloud"). The memory 14 is operative to store, and the processing circuitry 12 is operative to execute, software that implements a NRM PM procedure described herein to obtain and report specified measurements of network activity. In particular, the processing circuitry 12 is operative to perform the method 100 described and claimed herein. The network equipment 10 may additionally have components or circuits not depicted in FIG. 6, such as a wireless communication transceiver or other dedicated network hardware, a user interface, and the like.

The network management node 20 includes processing circuitry 22, memory 24, and communication circuitry 26. Although the memory 24 is depicted as being separate from the processing circuitry 22, those of skill in the art understand that the processing circuitry 22 includes internal memory, such as a cache memory or register file. Those of skill in the art additionally understand that virtualization techniques allow some functions nominally executed by the processing circuitry 22 to actually be executed by other hardware, perhaps remotely located (e.g., in the so-called "cloud"). The memory 24 is operative to store, and the processing circuitry 22 is operative to execute, software that obtains and reports specified measurements of network activity, according to a NRM PM procedure as described herein. In particular, the processing circuitry 22 is operative to perform the method 200 described and claimed herein. The network management node 20 may additionally have components or circuits not depicted in FIG. 6.

In all embodiments, the processing circuitry 12, 22 may comprise any sequential state machine operative to execute machine instructions stored as machine-readable computer programs in memory 14, 24, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

In all embodiments, the memory 14, 24 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the communication circuits 16, 26 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 16, 26 implement receiver and transmitter functionality appropriate to the communication network links (e.g., optical, electrical, and the like). The transmitter and receiver functions may share circuit components and/or software, or alternatively may be implemented separately.

Embodiments of the present invention present numerous advantages over the prior art. Network activity measurements, and their reporting periods, are predetermined and provisioned to the managed equipment; hence complex "jobs" need not be established and managed at run time (e.g., the prior art createMeasurementJob command). The network management system controls each instance of managed equipment directly and individually, avoiding the need for an intervening agent. This also avoids the requirement of prior art systems to implement a subscription management system with managed equipment at run-time, which was required for the managed equipment to send the prior-art "notify file ready" to the network management system so that the network management system could fetch the measurement results file. Rather, according to embodiments of the present invention, the network management system reads measurement results files from a file location known to both the network management system and the managed equipment.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by equipment operative in a network, of participating in a Network Resource Management (NRM) Performance Monitoring (PM) procedure, characterized by:
    maintaining a NRM Information Object Class (IOC) ManagedElement object containing one or more NRM IOC ManagedFunction objects, each ManagedFunction object operative to perform specified measurements by the equipment and report the results;
    maintaining a NRM IOC PMControl object including an administrative state attribute set directly by a network management system, that initiates and controls measurements for PM, without use of an intervening Element Management entity, to begin measurements and reset directly by the network management system to suspend or end measurements, and an operational state attribute set by equipment when permissions and access allow measurement and reporting to proceed, and one of a notification target attribute and file location attribute for reporting the results of the specified measurements;
    maintaining, for each ManagedFunction object, one or more NRM dataType Measurement objects, each Measurement object including attributes specifying a measurement to be performed and a reporting period;
    verifying the availability of resources required to perform the specified measurements and access to the specified reporting mechanism, and indicating such availability and access by setting the operational state attribute of the PMControl object; and
    upon a network management system directly setting the administrative state attribute of the PMControl object, and if the operational state attribute of the PMControl object is set, for each Measurement object, performing the specified measurement and assembling the results; and
    at the expiration of each reporting period, reporting the results;
    whereby the equipment performs measurements in response to the administrative and operational state attributes of the PMControl object, and without a subscription to an Element Management entity or executing measurement jobs initiated and controlled by an Element Management entity.

2. The method of claim 1, wherein reporting the results comprises:
    if the notification target attribute of the PMControl object is set, sending the results to the specified target; and
    if the file location attribute of the PMControl object is set, writing the results to the specified file location.

3. The method of claim 1 wherein writing the results to the specified file location comprises:

verifying sufficient space available at the specified file location to write the current measurement results; and if insufficient space is available, deleting older measurement results to make room to write the current measurement results.

4. The method of claim 1 further comprising, if the network management system resets the administrative state attribute of the PMControl object, ceasing to report any measurement results.

5. The method of claim 1 wherein the ManagedElement object and ManagedFunction objects are provisioned in the equipment.

6. The method of claim 1 wherein the Measurement objects are created cooperatively by a vendor of the equipment and an operator of the network management system.

7. The method of claim 6 wherein the Measurement objects cannot be altered at run-time.

8. The method of claim 1 wherein the administrative state attribute of the PMControl object is set or reset by the network management system at run-time.

9. The method of claim 1 wherein the operational state attribute of the PMControl object is set or reset by the equipment at run-time, in response to the availability of resources or access.

10. Equipment operative in a network, characterized by:
communication circuitry adapted to send measurement results to a network node or write the results to a file location;
measurement circuitry adapted to perform specified measurements; and
processing circuitry operatively connected to the communication circuitry and measurement circuitry, and configured to:
maintain a Network Resource Management (NRM) Information Object Class (IOC) ManagedElement object containing one or more NRM IOC ManagedFunction objects, each ManagedFunction object operative to perform specified measurements by the equipment and report the results;
maintain a NRM IOC PMControl object including an administrative state attribute directly set by a network management system, that initiates and controls measurements for PM, without use of an intervening Element Management entity, to begin measurements and reset directly by the network management system to suspend or end measurements, and an operational state attribute set by the equipment when permissions and access allow measurement and reporting to proceed, and one of a notification target attribute and file location attribute for reporting the results of the specified measurements;
maintain, for each ManagedFunction object, one or more NRM dataType Measurement objects, each Measurement object including attributes specifying a measurement to be performed and a reporting period;
verify the availability of resources required to perform the specified measurements and access to the specified reporting mechanism, and indicate such availability and access by setting the operational state attribute of the PMControl object; and
upon a network management system setting the administrative state attribute of the PMControl object, and if the operational state attribute of the PMControl object is set, for each Measurement object, perform the specified measurement and assemble the results; and at the expiration of each reporting period, report the result;
whereby the equipment performs measurements in response to the administrative and operational state attributes of the PMControl object, and without a subscription to an Element Management entity or executing measurement jobs initiated and controlled by an Element Management entity.

11. The equipment of claim 10, wherein the processing circuitry is configured to report the results by:
if the notification target attribute of the PMControl object is set, sending the results to the specified target; and
if the file location attribute of the PMControl object is set, writing the results to the specified file location.

12. The equipment of claim 10 wherein the processing circuitry is configured to write the results to the specified file location by:
verifying sufficient space available at the specified file location to write the current measurement results; and
if insufficient space is available, deleting older measurement results to make room to write the current measurement results.

13. The equipment of claim 10 wherein the processing circuitry is further configured to, if the network management system resets the administrative state attribute of the PMControl object, cease to report any measurement results.

14. The equipment of claim 10 wherein the ManagedElement object and ManagedFunction objects are created by the equipment vendor upon its manufacture.

15. The equipment of claim 10 wherein the PMControl object and Measurement objects are created cooperatively by an operator of the equipment and an operator of the network management system.

16. The equipment of claim 15 wherein the Measurement objects cannot be altered at run-time.

17. The equipment of claim 10 wherein the administrative state attribute of the PMControl object is set or reset by the network management system at run-time.

18. The equipment of claim 10 wherein the operational state attribute of the PMControl object is set or reset by the equipment at run-time, in response to the availability of resources or access.

19. A non-transitory computer readable medium, having thereon instructions operative to cause processing circuitry on an instance of network equipment to participate in a Network Resource Management (NRM) Performance Monitoring (PM) procedure, by performing the steps of:
maintaining a NRM Information Object Class (IOC) ManagedElement object containing one or more NRM IOC ManagedFunction objects, each ManagedFunction object operative to perform specified measurements by the equipment and report the results;
maintaining a NRM IOC PMControl object including an administrative state attribute set directly by a network management system, that initiates and controls measurements for PM, without use of an intervening Element Management entity, to begin measurements and reset directly by the network management system to suspend or end measurements, and an operational state attribute set by equipment when permissions and access allow measurement and reporting to proceed, and one of a notification target attribute and file location attribute for reporting the results of the specified measurements;
maintaining, for each ManagedFunction object, one or more NRM dataType Measurement objects, each Measurement object including attributes specifying a measurement to be performed and a reporting period;

verifying the availability of resources required to perform the specified measurements and access to the specified reporting mechanism, and indicating such availability and access by setting the operational state attribute of the PMControl object; and upon a network management system setting the administrative state attribute of the PMControl object, and if the operational state attribute of the PMControl object is set, for each Measurement object, performing the specified measurement and assembling the results; and at the expiration of each reporting period, reporting the results;

whereby the equipment performs measurements in response to the administrative and operational state attributes of the PMControl object, and without a subscription to an Element Management entity or executing measurement jobs initiated and controlled by an Element Management entity.

20. A method, performed by a network management system initiating and controlling a Network Resource Management (NRM) Performance Monitoring (PM) procedure in a network, of obtaining measurements from network equipment, characterized by:

directly setting, without use of an intervening Element Management entity, an administrative state attribute of a NRM Information Object Class (IOC) PMControl object maintained by the equipment, allowing one or more NRM IOC ManagedFunction objects maintained by the equipment to perform measurements and report the results as specified in one or more NRM dataType Measurement objects associated with each ManagedFunction object, if an operational state attribute of the PMControl object has been set by the equipment when permissions and access allow measurement and reporting to proceed; and after the expiration of each reporting period as specified in each Measurement object, obtaining the specified measurement results;

whereby the equipment performs measurements in response to the administrative and operational state attributes of the PMControl object, and without a subscription to an Element Management entity or executing measurement jobs initiated and controlled by an Element Management entity.

21. The method of claim 20, wherein obtaining the specified measurement results comprises:

if a notification target attribute of the PMControl object is set, receiving the results from the equipment; and if a file location attribute of the PMControl object is set, reading the results from the specified file location.

22. The method of claim 20, further comprising resetting the administrative state attribute of the PMControl object to halt the equipment from reporting any measurement results.

23. A management node operative in a network and initiating and controlling a Network Resource Management (NRM) Performance Monitoring (PM) procedure in the network, characterized by:

communication circuitry configured to receive measurement results from equipment or read the results from a file location; and processing circuitry operatively connected to the communication circuitry and configured to directly set, without use of an intervening Element Management entity, an administrative state attribute of a NRM Information Object Class PMControl object maintained by the equipment, allowing one or more NRM IOC ManagedFunction objects maintained by the equipment to perform measurements and report the results as specified in one or more NRM dataType Measurement objects associated with each ManagedFunction object, if an operational state attribute of the PMControl object has been set by the equipment when permissions and access allow measurement and reporting to proceed; and after the expiration of each reporting period as specified in each Measurement object, obtain the specified measurement results;

whereby the equipment performs measurements in response to the administrative and operational state attributes of the PMControl object, and without a subscription to an Element Management entity or executing measurement jobs initiated and controlled by an Element Management entity.

24. The management node of claim 23, wherein the processing circuitry is configured to obtain the specified measurement results by:

if a notification target attribute of the PMControl object is set, receiving the results from the equipment; and if a file location attribute of the PMControl object is set, reading the results from the specified file location.

25. The management node of claim 23, wherein the processing circuitry is further configured to reset the administrative state attribute of the PMControl object to halt the equipment from reporting any measurement results.

26. A non-transitory computer readable medium, having thereon instructions operative to cause processing circuitry on a management node operative in a network to initiate and control a Network Resource Management (NRM) Performance Monitoring (PM) procedure in the network, by performing the steps of:

directly setting, without use of an intervening Element Management entity, an administrative state attribute of a NRM Information Object Class (IOC) PMControl object maintained by network equipment, allowing one or more NRM IOC ManagedFunction objects maintained by the equipment to perform measurements and report the results as specified in one or more NRM dataType Measurement objects associated with each ManagedFunction object, if an operational state attribute of the PMControl object has been set by the equipment when permissions and access allow measurement and reporting to proceed; and after the expiration of each reporting period as specified in each Measurement object, obtaining the specified measurement results;

whereby the equipment performs measurements in response to the administrative and operational state attributes of the PMControl object, and without a subscription to an Element Management entity or executing measurement jobs initiated and controlled by an Element Management entity.

* * * * *